Patented Jan. 26, 1943

2,309,088

UNITED STATES PATENT OFFICE 2,309,088

MANUFACTURE OF MODIFIED RESIN

László Auer, East Orange, N. J.

Application March 12, 1941, Serial No. 383,049
In Hungary May 19, 1926

12 Claims. (Cl. 260—102)

This invention relates to the manufacture of Modified organic isocolloids and it comprises processes of Modifying organic isocolloids, particularly resins, with the aid of an amine compound as the modifying agent, wherein a minor amount of an amine compound is dispersed or dissolved in the resin or other organic isocolloid to produce the desired modification thereof, the mixture being advantageously heated to facilitate the incorporation of the said modifying agent and the modification of the organic isocolloid, and it also comprises the modified resins and other modified organic isocolloids so obtained, said modified products being useful in making plastics and plastic and liquid coating compositions and containing an amount of amine compound dispersed therein sufficient to substantially and advantageously modify their properties, and it further comprises plastic compositions and liquid coating compositions containing such modified organic isocolloid products, particularly those containing modified resin products; all as more fully hereinafter set forth and as claimed.

In my prior applications, some of which are more fully identified post, I have described processes of modifying the properties of organic isocolloids, such as fatty oils, resins etc., particularly their physical properties such as viscosity, melting point, etc., as well as other properties thereof. As stated in said applications, the modified organic isocolloid materials obtained by the processes described therein, are useful for various purposes; the modified products so obtained from fatty oils, resins, etc., being useful and advantageous in making varnishes, lacquers and other liquid and plastic compositions.

The present invention also relates to such processes. And this application is directed to certain of the processes described in said prior applications.

This application is a continuation-in-part of my copending, prior application Serial No. 446,170, filed April 21, 1930 (now Patent No. 2,234,949). That application is, in turn, a continuation-in-part of my application Serial No. 143,786, filed October 23, 1926 (now Patent 2,189,772) and of other applications previously filed by me, particularly Serial No. 359,425, filed April 30, 1929 (now Patent 2,213,944); said Serial No. 143,786 being the parent application of all such prior applications. Certain subject matter disclosed herein is also disclosed in my copending application Serial No. 318,650, filed February 12, 1940 (now Patent No. 2,298,270).

In my prior applications, listed ante, I have disclosed various methods of modifying organic isocolloid materials using many different modifying agents. As there disclosed, my generic invention relates to processes for the modification of the physical properties of organic isocolloids and to the modified organic isocolloid products obtained. And by the terms "organic isocolloids" and "organic isocolloid materials," I mean organic isocolloid substances wherein the dispersed phase and the dispersion medium of the colloidal system thereof are both of the same chemical composition but in a different state. That is, such organic isocolloids are mixtures of chemically similar organic carbon compounds wherein one or more of those compounds are dispersed or dissolved in the others which serve as the dispersion medium of this isocolloid system.

In my prior applications, I have given various examples of such organic isocolloid materials as illustrative of those which may be used as suitable starting materials in my processes. As there disclosed, such starting materials or organic isocolloid materials are fatty oils, mineral oils, natural resins, waxes (animal, vegetable, etc.) tar and tar oils, asphalt and asphalt oils, goudron or petroleum distillation residues, pitches, high boiling point mineral oil fractions containing naphthenic acid, artificial (synthetic) resins, particularly those containing natural resins or acids of fatty oils and of resins, rubber and rubber-like hydrocarbons (synthetic rubbers), fatty acids, their derivatives, etc.; these being typical general examples of natural and artificial organic isocolloids. Also, chemically pure isocolloid bodies, such as styrene, etc. may be used as the starting material as disclosed in the aforesaid prior applications.

Likewise, in my said prior applications I have given various illustrative examples of the modifying agents useful in my processes of modifying organic isocolloid materials. As disclosed in those applications, I have found that by dispersing or dissolving such modifying agents in the organic isocolloid materials, I obtain modified products having altered physical properties, etc., which are useful for various purposes in the commercial or industrial arts. As there disclosed, the modifying agents are employed in minor amounts and are inorganic or organic compounds containing ions, radicals or residues capable of influencing the said modification of the organic isocolloid substance.

Such modifying agents are "electrolytes" or polar compounds, such as salts of organic and inorganic acids, organic and inorganic acids, metallic derivatives of inorganic compounds, etc., as disclosed in my Serial No. 143,786. And as disclosed in my Serial No. 359,425, organic polar compounds comprising within the molecule an acidic inorganic residue and an organic residue are advantageous modifying agents, in my processes. By an acidic inorganic residue, I mean such an inorganic residue as can be converted by the addition of one or more hydrogen atoms into an inorganic acid (including carbonic acid as inorganic). It will be seen from the above definition and from the illustrative compounds disclosed in my Serial No. 359,425, that this generic class of modifying agents includes such compounds as (1) organic halogen derivatives, (2) organic sulfonic acids and their halides and salts, including esters thereof, (3) esters of inorganic acids and (4) inorganic salts of organic bases. Many examples illustrative of each of these classes are given in my said Serial No. 359,425. Some of the modifying agents specifically disclosed in that application are illustrative of other classes of modifying agents useful in my processes. That is, they contain a plurality of constituents, groups or radicals imparting polarity to such compounds. For instance, among the specific examples of modifying agents there disclosed, I have mentioned the following compounds:

4-chloro-o-anisidine
    Sodium 2:6:8 naphthylamine disulphonate
    Sodium 1:8:3:6 aminonaphthol disulphonate
    2:6 naphthylamine sulphonic acid
    2:1 naphthylamine sulphonic acid
    2-phenylamine-8-naphthol-6-sulphonic acid
    Beta-naphthylamine 3:6:8 trisulphonic acid
    m-Xylidine sulphonic acid
    p-Toluidine m-sulphonic acid
    m-Nitroaniline hydrochloride
    Diaminodiphenylamine sulphate
    Amino-azo-benzene sulphate
    Diphenylamine sulphate
    Diphenylamine hydrochloride
    Diphenylamine hydrobromide
    Diphenylamine trichloracetate
    Trichloraniline hydrochloride
    p-Nitroacetanilide
    Dinitroaniline
    Fluoresceine
    Eosin
    Thiocarbanilide
    4:4'-diaminodiphenylsulphide
    Phthalimide
    Aminosalicylic acid
    Benzidine That is, many of the specific modifying agents disclosed in my Serial No. 359,425 also contain amine or substituted amine groups and such modifying agents containing amino groups are useful in the practice of the present invention.

In fact, I have found that amine compounds as a class are advantageous modifying agents in my processes of modifying organic isocolloids, particularly in making modified products from fatty oils and resins. They are more readily soluble in such organic isocolloids and have other advantages as the modifying agent in my processes. Further, the modified products obtained with the aid of amine compounds have certain advantageous properties.

In my copending application Serial No. 446,170, I have described processes of modifying fatty oils and other organic isocolloids, such as resins, etc., wherein amine compounds are used as the modifying agent. In that application, in addition to the amine compounds disclosed in my prior Serial No. 359,425, I disclose further examples of amine compounds useful as the modifying agent in such processes. As stated in my application Serial No. 446,170, certain classes of amine compounds are advantageous in modifying fatty oils, resins and like organic isocolloids. Many specific, illustrative examples of such amine compounds are given in that application, including the following compounds:

Benzidine
    p-Phenylenediamine
    Beta-naphthylamine
    Dianisidine
    pp-Diamino-diphenylmethane
    pp-Diaminodiphenylamine
    pp-Diaminobenzophenone
    pp-Diaminodiphenyl ether
    pp-Diaminodiphenyl sulphide (thioaniline)
    pp-Diaminodiphenylurea
    pp-Diaminodiphenylthiourea
    m-Phenylenediamine
    Alpha-naphthylamine
    Michler's ketone
        Michler's hydrol
    Benzylethylanilinesuphonic acid
    Safranine
    1:4-diaminoanthraquinone
    o-Phenylenediamine
    Diaminodihydroxyanthraquinonedisulphonic acid
    Diaminotetrahydroxyanthraquinone disulphonic acid
    p-Tolylenediamine
    p-Diaminomethylcarbazole
    Eurhodine
    Diaminodiphenazine
    Diaminofuchsonimine That is, a wide range of amine compounds may be used as the modifying agent in my processes. And the specific examples ante are merely illustrative of those which are advantageous in modifying fatty oils, resins and like organic isocolloids. And in the broad practice of this invention, various types of amine compounds may be employed.

The present invention, as stated ante, also relates to the manufacture of modified organic isocolloids, useful in making plastics and plastic and liquid coating compositions and for other purposes, by such processes. And this application is directed to those processes wherein the organic isocolloid, particularly resins both natural or artificial resins, are modified by means of and with the aid of amine compounds as the modifying agent. Accordingly the several procedures and methods disclosed in my Serial No. 446,170 and other prior applications may be used in the practice of the present invention to incorporate the modifying agent, to wit, the amine compound, in the organic isocolloid, to wit, the resin etc., and to effect the desired modification thereof.

In other words, the present processes may be carried out in the same manner disclosed in any of my prior applications, particularly those disclosed in Serial No. 446,170, and the proportions of modifying agents, temperatures, pressures, etc., disclosed in those applications may be used with advantage here.

As disclosed in my Serial No. 446,170 (and other prior applications) the modifying agent should be added to the starting material in a dry form (without the presence of water) and in relatively small quantities. That is, a minor amount of modifying agent is employed here, as in my prior applications.

As shown in those applications, a small percentage of the modifying agent by weight on the starting material is sufficient in most cases to produce the desired modification. And as stated in my Serial No. 446,170, generally 1 to 10 per cent of the modifying agent should be added. But in certain cases satisfactory results may be obtained with less than 1 per cent of the modifying agent. For instance, many varnishes and other compositions containing my modified resins and only a fraction of a per cent of an amine compound, as the modifying agents, have improved and advantageous properties. And in some cases the percentage of amine compound may be as low as 0.01 per cent in such improved compositions or final products. On the other hand, in other embodiments of this invention I may employ more than 10 per cent of the modifying agent; sometimes as high as 30 per cent. This is advantageous in making greatly modified products and in some cases from 10 to 30 per cent of the modifying agent, usually 20 to 25 per cent, may be used. The greatly modified products so obtained are themselves useful as modifying agents for other organic isocolloids or for more of the same isocolloid, as disclosed in my applications Serial Nos. 356,103, filed September 9, 1940, and 446,172; the latter now being Patent No. 2,213,943. Thus the modified products obtained by the present invention may contain from 0.01 to 30 per cent of an amine compound as the modifying agent.

And in making my modified isocolloid products by the present invention, I employ an amount of amine compound within the ranges given ante and thoroughly incorporate the amine compound in the organic isocolloid to be modified.

In order to insure complete dissolution or dispersion of the modifying agent, the operation of dissolving or dispersing it in the organic isocolloid should be carried out under the application of heat. That is, it is advantageous to heat the mixture of organic isocolloid and modifying agent as disclosed in my prior applications. The degree of heat necessary depends upon the nature of the substance under treatment and also the modifying agent used.

The same depends also on the principle whether the product made is a finished product used as such, or an intermediate in making such finished product. For instance, if the application of a certain heating is necessary to obtain a desired result and the resin treated is used in varnish cooking, a mere dispersion of the amine modifying agent in the resin may be satisfactory, and the heating may be concluded during the varnish cooking procedure. On the other hand, if a resin is made and used in plastics or plastic coatings, then the heating is necessary while treating the resin with the amine modifying agent.

Generally the temperatures employed are sufficient to produce a uniform homogeneous modified product with the particular mixture employed. And as stated in my Serial No. 143,786, the temperatures giving the best results are those considerably above room temperature and below the boiling or decomposition point of the materials employed. And as stated in that application, the organic isocolloid (starting material) and the modifying agent may be melted together, that is, fused into a homogeneous composition.

In general, as disclosed in my prior applications Serial Nos. 359,425 and 446,170, temperatures from 100 to 300° C. gives satisfactory results in most cases. Most of the natural resins melt or fuse within this temperature range and can be readily modified by heating to temperatures sufficient to fuse or melt them in the presence of the modifying agent. That is, the resin and modifying agent may be simply melted together or fused into a homogeneous mass as stated in Serial No. 143,786, if both are readily fusible and miscible with each other. This is usually the case with amine compounds as the modifying agent; they being readily miscible or easily soluble in most resins at such temperatures.

Only occasionally are temperatures above 300° C. necessary to produce satisfactory results. In such cases, higher temperatures may be employed, say as high as 350° C. if necessary. But generally it is desirable to use lower temperatures and this is possible in most cases. For instance, most synthetic resins are fusible or thermoplastic within the temperature range given ante and can be modified in substantially the same way as natural resins. Of course, synthetic resins having lower melting point can be modified at lower temperatures. And in the case of synthetic resins which are liquid at room temperature, the modifying agent can be incorporated by a simple mixing. And when the amine compound is directly soluble in such liquid starting materials, the mixing and modification can be effected at room temperature. That is, in some cases, the starting material and modifying agent can be mixed cold, as stated in my Serial No. 143,786. In such cases, the mixture can be subsequently heated to produce further modification of the organic isocolloid if desired.

In general, the temperatures employed in my present processes are below that at which the resultant modified resin decomposes and are sufficient to fuse or melt the mixture into a uniform, homogeneous modified product. And as stated ante, temperatures between 100 and 300° C. are advantageous in most cases and are usually employed in my present processes. However, other suitable temperatures may be employed. And as stated in my Serial No. 143,786, the complete dispersion, molecular or colloidal, of the modifying agent in the organic isocolloid material to be treated and modified is an essential element of my processes.

The heat treatment promotes the complete (molecular or colloidal) dissolution of the modifying agent in the substance to be treated. It also facilitates the desired modification. And in some cases it is desirable to continue the heat treatment after the dissolution or dispersion of the modifying agent is substantially complete. In this way further modification of the isocolloid can be obtained, as shown in my prior applications.

I have further found that the properties of the products obtained can be influenced by the nature and physical condition of the gas present in contact with the material undergoing treatment. That is, by varying the pressure, the specific nature of the products can be somewhat changed. The present processes can be effected under reduced, atmospheric or increased pressure. And I have found that the products produced under vacuum or under increased pressure (higher than atmospheric) are somewhat different from those produced under atmospheric pressure or in open kettles. For one thing, the melting point of the respective products are somewhat different.

Likewise, I have found that the presence of air or other gases somewhat alters the results obtained. For instance, the products obtained by heating in the presence of air are somewhat different from those obtained when the mixture is heated in contact with other gases, such as carbon dioxide, nitrogen, hydrogen sulphide, sulphur dioxide etc. or mixtures of gases. It may be stated with reference to the action of gases that generally speaking rarification of the gases present in the reaction chamber by the reduction in pressure tends to intensify their action in my processes.

And in my present processes, I may employ a gas treatment in conjunction with the modifying action of the amine compounds. The gas treatment may be carried out by blowing the gas through the reaction mixture or simply by passing it over the mass contained in the reaction chamber. For this purpose I may employ active or inert gases. In doing so, I find that $CO_2$, nitrogen, hydrogen sulphide and $SO_2$ are advantageous. Further, the gas may be produced in situ in the reaction mass by using substances which under the conditions of reaction develop the desired gas, such, for instance as carbonates, sulphides, sulphates and the like, all of which develop corresponding gases in the reaction mass.

Likewise, if desired, the modifying agent may be produced in situ within the mass under treatment.

Further, I have found that the dissolution or dispersion of the modifying agents in the starting material may be favorably influenced by the addition of certain "auxiliary agents" or "sensitisers." These fall into two groups, namely, the purely inorganic sensitisers and the purely organic sensitisers. Typical purely inorganic sensitisers are silica gel, fuller's earth and like materials. As purely organic sensitisers or auxiliary agents, the following are typical:

Formaldehyde
Phenol
Thiocarbanilide
Benzidine
Hexamethylene tetramine
2:3-hydronaphthoic acid
Naphthol
Quinoline
Pyrogallol
Benzene
Glycerol
Phthalimide The specific examples of auxiliary agents mentioned ante are to be taken as typical of the substances which have been successfully used for this purpose and not as comprising all the effective substances. It should be mentioned that quite a number of the modifying agents comprising within the molecule an acidic inorganic residue and an organic residue are also useful as auxiliary agents or sensitisers and may be used in conjunction with other modifying agents, such as the amine compounds here employed as the modifying agent. For instance, the specific examples of such sensitisers mentioned in my Serial No. 446,170 are also useful in the present processes.

The advantages of a rapid dissolution of the modifying agent are greatest in those cases where a clear, pale or colorless product is desired, especially, for example, for the varnish industry.

For the modification of the physical properties of the initial materials, true or colloidal solutions of one or more modifying agents in an organic solvent may be used.

And as stated in my Serial No. 446,170 and in other prior applications, my modified organic isocolloid products may be further modified by adding sulfur to the initial substance in addition to the modifying agents already mentioned. The sulfur may be added as such or in the form of a sulfur compound such as sulfur chloride which, under the conditions of the process, decomposes with liberation of nascent sulfur. Apparently the action of the sulfur is analogous to that which takes place in the vulcanization of rubber. The sulfur or sulfur compounds may be added either at the beginning of the process or so as to act only during the gas treatment part of the process. Alternately, the sulfur or sulfur compounds may be added to the material after the main process has been completed. That is, my modified products may be subsequently heated with sulfur or sulfur compounds as described in my prior applications.

In vulcanizing or sulfurizing my modified isocolloid products, vulcanization activators, such as zinc oxide, etc., and vulcanization accelerators, such as triphenyl guanidine, mercaptobenzthiazole, tetraethylthiuram disulphide, etc., may be advantageously used. If super-accelerators, e. g., piperidine pentamethylenedithiocarbamate, diethylammonium diethyldithiocarbamate, etc., are added, vulcanization occurs below 100° C.

Further, alternating treatment with sulfur dioxide and hydrogen sulphide has been found to be specially useful in making my sulfurized modified products. A vulcanization treatment results from the formation of sulfur in situ.

In general, the modified products obtained by my present processes are useful in a variety of industries, such as the rubber, linoleum, varnish and other industries. As stated ante, they are useful in making plastic and liquid coating compositions.

A very important use of my new products is in the manufacture of new artificial materials by emulsification of organic colloids. One of the emulsification processes consists in subjecting the organic isocolloid first to a treatment with modifying agents as described ante and thereafter effecting further modification and transformation by emulsifying or dispersing the modified product in an aqueous medium. The aqueous emulsions or dispersions so obtained may be vulcanized or sulfurized by any of the above described methods.

The emulsions or dispersions so obtained, both the unvulcanized and vulcanized ones, are valuable for a variety of purposes. They may be concentrated and used for impregnation of textiles. Again, the dispersed phase may be separated from such emulsions by means of the usual coagulating agents to obtain new solid modified products. Likewise such solid products can be recovered from those emulsions by drying, that is, evaporating the water. Such aqueous dispersions are also useful as varnishes. Likewise, such emulsions may be used in admixture with natural rubber latex or an artifically prepared emulsion of rubber. Further uses of such emulsions are disclosed in my prior applications.

Further, in my present processes, the modification of the organic isocolloid can be advantageously facilitated, by exposing the materials undergoing treatment to oscillating energy such as X-rays, ultraviolet rays, infra red, etc., or by including the reaction chamber in an electric circuit thereby subjecting the mixture being modified to an electric potential.

Further, filling materials, pigments and the like may be added at any stage of the process.

In my processes the modification of the physical properties of these organic isocolloids is in part a colloidal chemical change in their physical structure. Such changes are generally partially or complete sol-gel changes (gelatinization) or partially or complete gel-sol changes (peptisation). And I have found that in those isocolloids in which the concentration of the dispersed phase is not high enough, it is necessary to increase this concentration by some means, for instance, by heating to obtain a satisfactory chemical colloidal change. On the other hand, if the dispersed phase concentration is sufficiently high, a simple dissolution of the modifying agent may be able to produce the desired modification. For this purpose, it is very important that the modifying agent should be easily soluble in the starting material. And this is one of the advantages of the amine compounds as modifying agents.

Having described the nature of my generic invention and generally set forth the procedural steps used in the practice of the present invention, I shall now illustrate the respective materials, namely the organic isocolloids (starting material) and the modifying agents (amine compounds), employed in the present methods.

The present invention may be applied to many and various natural and artificial (synthetic) resins, to obtain modified resin products useful in making plastic and liquid coating compositions and for other purposes. Advantageous modified products can be obtained from rosin (colophony) and other natural resins. And as stated in my Serial No. 359,425, rosins of French, Spanish and Greek origin, as well as those of American origin, can be modified by my processes. In the present invention, any of the commercial rosins, including both gum and wood rosins, may be used as the starting material for making my modified resin products.

Also, fossil gums and resins may be used, such as East India gum, Manila copal, Congo copal and other copals. In fact, any of the commercial copals and like natural resins may be used as the starting material in these processes. However, the copals should be first "fused" or "run," to obtain a reversibly fusible product, and then the fused or molten copal ("run" copal) treated according to the present invention. Even resins and gums of partly animal origin, such as shellac, etc., may be modified by the present processes.

Likewise, synthetic resins may be modified by the present processes. In fact, I have found that most synthetic resins are inherently organic isocolloids. That is, they are mixtures of chemically similar resinous compounds in which some of the resinous compounds are dissolved or dispersed in the remainder of the resinous mixture. This is particularly true in synthetic resins produced by the polymerization of simple chemical compounds; some of the polymers being dissolved in other polymers. In general, this is also true of most resins made by reacting together two or more chemical compounds and resinifying the mixture. And any synthetic or artificial resinous material which is an organic isocolloid, particularly those containing acid resins, may be used in the practice of the present invention.

Thus, a wide variety of synthetic resins and artificial resinous materials may be employed in the present methods and useful modified products obtained. However, certain types of synthetic resins may be used with advantage in the practice of this invention.

As stated in my prior applications, synthetic resins made from or containing natural resins, as a component thereof, are advantageous starting materials in the present processes. They, like the natural resins themselves, may be readily modified in accordance with my present invention.

The synthetic resins containing natural resins, such as rosin, etc., chemically combined in the resinous complex, give valuable modified resins by the present processes. For instance, the resinous esters obtained by esterifying natural resins with polyhydric alcohols are advantageous starting materials in this invention. The best known (and probably the simplest) of such resin esters is the so-called "ester gum." Commercially, ester gums are usually made by esterifying rosin with glycerine. Such ester gums or rosin glycerides are well known varnish resins and are widely used in making various varnishes. By the present invention, any of the commercial ester gums can be readily modified to improve their properties for such purposes.

Likewise, other resinous esters of glycerine and natural resins, such as copals, etc., may also be modified by my methods. Also, the resinous esters obtained by esterifying rosin, copals and other acid natural resins with other polyhydric alcohols, such as glycols, pentaerythritol, mannitol, sorbitol, etc., are useful as the starting material and give good modified resins.

In fact, I have found that resinous esters of polyhydric alcohols, generally, can be modified by my present processes. And those in which the polyhydric alcohol is esterified in part by a natural resin and in part by another acid, either mono- or di-basic acid, can be readily modified. For instance, the so-called "maleic resins" give advantageous modified resin products by my present processes. These "maleic resins" are resinous esters made by condensing and esterifying maleic anhydride, glycerine and rosin. Likewise, other resinous esters of polyhydric alcohols with di-basic acids (or anhydrides) and mono-basic acids, may be used as the starting material here. For example, the so-called "alkyd resins" can be readily modified by my present processes. Such resins have drying properties and are now widely used in making varnishes and other coating compositions. They may be made by esterifying glycerine with phthalic anhydride and a mono-basic acid capable of imparting drying properties to the resulting resin; the fatty acids of drying oils being usually employed as such mono-basic acid. However, sometimes rosin or other natural resin acids are used alone or in conjunction with said fatty acids in making such resins. Likewise, in lieu of phthalic anhydride.

other polybasic acids or their anhydrides are sometimes used, such as phthalic acid, adipic anhydride, sebacic anhydride, maleic anhydride and other dibasic acids and their anhydrides. Again, other polyhydric alcohols, such as those mentioned ante, are sometimes used in lieu of all or part of the glycerine. Further, such polyhydric alcohol-polybasic acid resin can be made in other ways than by direct esterification of the alcohol with the acids. However, irrespective of the way in which they are made, these resins are complex resinous esters of a polyhydric alcohol with a polybasic acid and a mono-basic acid capable of imparting drying properties to the resinous complex. And any and all of such resin can be modified by my present processes and good modified resin products obtained.

That is, in the practice of this invention, I may use synthetic resins made from or containing the acids of natural resins or of fatty oils or both, such as the resinous esters mentioned ante.

Further, by the present invention, I can also modify other synthetic resins containing natural resins, including those containing the natural resin as such. For instance, the so-called "resin-modified" phenolics or "Albertols" can also be modified by my present processes to improve their properties. Such phenolic resins are phenol-aldehyde resins containing a sufficient amount of natural resins or of esters thereof, to alter their solubility and other properties. They are now used in making varnishes, particularly the phenol-formaldehyde resins containing rosin or other natural resins or their esters with polyhydric alcohols, such as glycerine. In my present invention, any of these phenolic resins can be advantageously modified with the aid of amine compounds by my processes.

Thus in the practice of this invention, I can use a wide variety of resins, both natural and synthetic resins, and obtained a wide range of modified resin products useful in making plastic and liquid coating compositions.

In the present invention, as in the methods of my prior application Ser. No. 446,170, I employ a minor amount of an amine compound as the modifying agent. And as stated in that application a wide variety of amine compounds may be employed. Here, I may use primary, secondary or tertiary amines or amine compounds containing primary, secondary or tertiary amine groups. And I may use amine compounds containing two or more of such amine groups.

And I may use either aliphatic or aromatic amines. However, as stated in my Serial No. 446,170, the aromatic amines are advantageous modifying agents and are usually employed in the present processes. In general, aromatic amines having a relatively high molecular weight, such as mono-amines of naphthalene etc., are particularly useful as modifying agents. Likewise, aromatic diamines such as the diamines of phenylene, diphenyl, etc., are advantageous.

The various types of amine compounds which are advantageous in the present processes, are further illustrated by the following compounds which are typical of such amine compounds.

Mono-aromatic amines: R—NH$_2$

Alpha naphthylamine
Beta naphthylamine and the naphthylamines also containing sulphonic, hydroxy and other substituent groups.

Phenylene diamines: H$_2$N—R—NH$_2$

Para-phenylene diamine
Ortho-phenylene diamine
Meta-phenylene diamine
Para-tolylene diamine Diphenyl diamines: H$_2$N—R—R—NH$_2$ Benzidine
Dianisidine Diphenyl diamines of complex structure having the two phenyl connected with a "bridge" linkage: H$_2$N—R—X—R—NH$_2$ pp-Diamino-diphenyl methane     X=     —CH$_2$
pp-Diamino-diphenyl ether     X=     —O—
pp-Diamino-diphenyl sulphide     X=     —S—
pp-Diamino-diphenyl amine     X=     —NH—
pp-Diamino-diphenyl urea     X=—HN—CO—NH—
pp-Diamino-diphenyl thiourea     X=—HN—CS—NH—
pp-Diamino-diphenyl benzophenone     X=     —CO—

It is to be noted that in some of these compounds, oxygen, sulphur and other sustituent groups are present in the molecule in addition to the amine group or groups. Some contain secondary amine groups in addition to the primary amine group. In addition to these, other amines of even more complex structure may be used. The following are illustrative of such compounds:

Diamino dihydroxy anthraquinone disulphonic acids
Diamino tetrahydroxy anthraquinone disulphonic acids
1:4 diamino anthraquinone
p-Diamino-dimethyl carbazole
Michler's ketone
Michler's hydrol
Safranine
Eurhodine
Diaminodiphenazine
Diaminofuchsonimine
Benzyl-ethyl-anilinesulphonic acid The aromatic compounds containing condensed benzene nuclei, such as the anthraquinone compounds, etc., are advantageous.

In the diamine compounds given ante, the two amine groups are joined by an aromatic nucleus comprising one or more phenyl groups, the general formula being H$_2$N—Q—NH$_2$ wherein Q is an aromatic group.

In addition to the amine compounds given ante, other amine compounds may be employed. For instance, various aliphatic amines may be used. As many of the aliphatic amines are more or less volatile at the temperatures here employed, they may be incorporated in the resin in special ways. For instance, the mixture of amine and resin may be heated in closed vessels and the modification effected under increased pressure to retain the amine during such heating. However, as stated ante, I prefer to use aromatic amines in my present processes, as they have certain advantages as modifying agents. For instance, the aromatic amines having high molecular weight may be readily incorporated in the resin by heating in open vessels; they being less volatile.

And in the practice of the present invention, any and all of the specific amines disclosed in Serial No. 446,170 and my other prior applications may be used in the practice of the present invention. And as stated in Serial No. 446,170, the amines as a class are advantageous as modifying agents in that they are relatively easier to dissolve or disperse in organic isocolloids, such as fatty oils, resins, etc., to modify them. Here, they are dispersed in the resin in any suitable manner.

That is, my invention may be applied in various ways, as indicated ante. In those cases in which the concentration of the dispersed phase of the isocolloid system is high enough, the resin may be melted together with the modifying agent until the melt forms a clear homogeneous mass after cooling. In other cases in which the concentration of dispersed phase must be increased by a heating process, it is necessary to heat for a longer time or at higher temperatures, say 250–300° C., or both, in order to bring about the necessary increase of the dispersed phase concentration.

Further, the amines may be used either by themselves or in conjunction with other modifying agents, etc., in modifying resins according to the present invention, as indicated ante in my prior applications. For instance, the amines may be used in conjunction with polar compounds comprising within the molecule an acidic inorganic residue and an organic residue, as given ante. Sometimes they may be used with certain auxiliary agents as shown in Serial No. 446,170 and other of my prior applications. For instance, a small amount, generally not more than 5 per cent on the weight of the starting material of secondary purely organic metal-free agents, such as aldehydes, phenols, alcohols, ketones, hydrocarbons, etc., may be added in addition to the amine compound. Generally such additions facilitate the incorporation of the modifying agent and further modify the properties of the products so obtained. Again, it is sometimes advantageous to use as the modifying agent an organic polar compound containing both an amine group and an acidic residue such as the aromatic monosulphonic acids or other compounds of that type shown ante. That is, the various amines and procedures disclosed in Serial No. 446,170 may be used in the practice of the present invention.

Likewise the modification may be further influenced by irradiation with short wave oscillating energy such as ultraviolet rays, X-rays and the like; the mixture of resin and amine compound being subjected to such rays during the process.

Again, the application of an electric potential on the mixture favorably influences the modification.

However, the amine compounds are the primary modifying agents and the modification is obtained by means of and with the aid of these compounds. And a small percentage of the modifying agent is sufficient in most cases to cause the desired modification. Generally, 2 to 10 per cent of the amine compound is used in the present processes. But as stated ante, in certain cases satisfactory results may be obtained with less than 1 per cent or more than 10 per cent of the amine compound.

And the modified products obtained by the present invention vary with the particular resin employed, as well as with the particular amine compound used, the percentage thereof, the duration of heating, the temperature, the nature and physical state (pressure) of the gas present etc. and by selecting the materials employed and varying the said conditions of treatment, I can obtain modified products having the properties desired for a certain use.

And my modified products are useful for various purposes, due to their advantageous properties imparted to them by present invention. In particular, they are useful in making varnishes and other coating compositions having improved properties, as more fully set forth post.

The modified resin products obtained according to the present invention have many advantageous properties. In general, they have lower acid values and higher melting points than the original resin. Further, those prepared with amine compounds which are insoluble or only very slightly soluble in water, such as benzidine, etc., also have improved resistance to water; and usually their alkali resistance is also improved. That is, coatings containing such modified resin products are less attacked by dilute alkali solutions and therefore have improved resistance to washing, particularly with slightly alkaline soap solutions. Again, coatings containing my modified resin products, in general, have better ageing qualities when exposed to atmospheric conditions.

Thus, my modified resins are useful in making varnishes and other coating compositions having such improved properties. They are particularly useful in making coating compositions such as varnishes, etc., yielding films having very satisfactory water resistance and improved alkali resistance and other advantageous properties. For instance, they may be used in making floor paints and cement paints wherein resistance to water and alkali are important. Also they are useful in making varnishes and enamels for kitchen furniture. Likewise, they are useful in plastic and liquid coating compositions employed in making linoleum and other floor coverings.

These and other advantageous plastic and liquid coating compositions may be prepared in various ways. In some cases, varnishes and the like may be made by simply dissolving my modified resin products in suitable volatile solvents. And my modified products are readily soluble in various types of varnish solvents such as mineral spirits, aromatic hydrocarbons and other volatile organic solvents used in the commercial art. Likewise, my modified resin products may be compounded with other varnish ingredients to produce improved coating compositions. And usually, my modified products are not used alone as protective coating. For instance, they may be cooked into a varnish by adding fatty oils, such as drying oils or semi-drying oils, to them and cooking the oil and modified resin together until the desired varnish base is obtained. Further, any of the ordinary resins now used in making varnishes, can be introduced into the varnish mixture and cooked in in the usual way. That is, my improved modified resin products can be made into varnishes by any of the procedures now used in the commercial manufacture of varnishes and like coating compositions. And after the desired varnish base is obtained, by the usual cooking together of the varnish ingredients, it is cooled and thinned, that is, dissolved in a suitable mixture as is the customary practice in the art. The combination of oil, resin and thinner is the varnish. And suitable driers may be incorporated, as is the customary practice in the art. My improved varnishes so obtained may be used alone as a protective coating or made into a paint or enamel by grinding pigments into the same. In other words, I make my improved varnishes in any of the ordinary ways and obtain the desired improvements by incorporating a suitable amount of my modified resin products.

The improvements so obtained have been described ante. As there stated, I obtain various improvements. Of those improvements, two are outstanding, namely, better ageing qualities and improved water resistance. These are important improvements. They are evident when the films obtained from my improved varnishes are compared with coatings from a similar varnish made without my amine modified resins.

Further as disclosed in my Serial No. 446,170, and other prior applications, my modified resin products may be advantageously vulcanized with sulfur or sulfur compounds by the processes there disclosed and previously set forth ante, to obtain other useful products. As there stated, the vulcanization may be advantageously influenced by the use of accelerators such as mercaptobenzthiazole, etc., or of activators, such as zinc oxide, etc., or both; the use of such vulcanization aids permitting the vulcanization to be carried out at lower temperatures or in a shorter time or both. In some cases, the vulcanization process is also greatly facilitated by the application of steam during the vulcanization or upon the completion thereof, and this leads to improved products in most cases.

The vulcanized or sulfurized products so obtained are also useful in making varnishes. Further, they are also useful in making rubber compositions and may be used in such compositions as rubber substitutes, as set forth ante and as disclosed in my prior applications.

Again, my modified resin products, both my vulcanized and unvulcanized products, are also useful in making aqueous coating compositions wherein my modified resin products are emulsified in an aqueous medium. Such aqueous compositions may be prepared in various ways. For instance, the resin or other resinous aromatic isocolloid may be modified or partially modified by a treatment with the amine compound and the product so obtained further modified and transformed by emulsification or dispersion in an aqueous medium, with or without the aid of emulsifying (dispersing) agents or protective colloids or both. In such processes the aryl amines are satisfactory modifying agents. Such aryl amines are also satisfactory modifying agents in those processes wherein the starting material is first emulsified in an aqueous medium and the emulsion so obtained is subsequently treated with a small amount of an aromatic amine as the modifying agent to produce the desired modification of the organic isocolloid while it is emulsified in such aqueous medium.

Further, aqueous emulsions of vulcanized modified resin products can also be prepared and are useful for various purposes. For instance, the sulfur may be first dispersed in or distributed throughout the modified resin product to be vulcanized to effect an initial vulcanization and then the sulfur-containing mixture dispersed or emulsified in the aqueous medium and in this emulsified condition subjected to a suitable temperature until the desired degree of vulcanization is obtained. Likewise, my vulcanized modified resin products may also be directly emulsified in suitable aqueous media. In either case, the emulsification may be carried out with the aid of the usual emulsifying agents, such as a sulphonated oil, etc., with or without further addition of protective isocolloids. Here too, the vulcanization process is greatly facilitated by the application of steam during vulcanization in the emulsified state.

As stated ante, such aqueous emulsions of my modified products are useful for various purposes and various useful products can be obtained by separating the water from such compositions by any of the procedures described ante.

Further, in making my modified resin products and compositions containing the same, pigments or fillers, or both, may be added at any convenient stage if desired.

Thus, the present invention comprises a wide variety of modified resin products and compositions containing the same.

In making these modified resin products with the aid of amine compounds as the modifying agent, I usually mix a minor amount of the amine compound, say 1 to 10 parts, with 100 parts of resin, and heat the mixture to temperatures sufficient to fuse the mixture and produce a uniform homogeneous modified product; temperatures between 100 and 300° C. ordinarily being employed. And the heating may be effected under reduced, atmospheric or increased pressure. In most cases, it is effected under atmospheric pressure and the mixture can be heated in open kettles. However, closed vessels may be employed in some cases and this is done when the modification is effected under either reduced or increased pressures.

The exact mechanism by which the modification is effected is not fully known. However, as the modified products have a lower acid value than the original resin, undoubtedly part of the resin acids are neutralized by some of the amine used and amine soaps or acylated amine compounds are formed in situ. Such amine compounds are themselves modifying agents. However, other changes are also effected which are colloidal in nature. For instance, the melting point of the modified resin product is higher than that of the starting material in most cases and evidently there is a colloidal change in the gel structure of the resin. Further, my modified products have other advantageous properties and those properties are due in part to a substantial amount of amine compound dispersed in the modified products so obtained. While I do not fully know the exact mechanisms involved in modifying resins by my processes, I have found that such processes produce modified products having improved advantageous properties, as shown ante.

To further illustrate my invention certain specific embodiments thereof are described. However, in the broad practice of my invention other embodiments thereof may be employed as shown ante.

And my invention is illustrative but not limited by the following examples, in which the parts are by weight:

*Example 1.*—300 parts of rosin are heated under vacuum with 15 parts of m-phenylenediamine at 260–270° C. for 3 to 5 hours. On cooling the product so obtained is harder than original resin. It is very useful in the manufacture of varnishes having good water resisting properties.

*Example 2.*—300 parts of rosin are treated with 15 parts of Michler's hydrol exactly as described in Example 1. The product in this case also is a hardened resin giving good water resisting varnishes.

The following examples illustrate the modification of a good grade wood rosin by my process, namely, a commercial N-Wood rosin having a melting point of 79° C. and an acid value of 167.

*Example 3.*—100 parts of said N-Wood rosin and 5 parts of benzidine are heated in an open stainless steel kettle (at atmospheric pressure) at 240° C. for two hours. The resultant modified resin has a ruby color and is a modified resin having the following properties:

| | |
|---|---|
| Melting point (mercury method)_____°C__ | 95 |
| Acid value_____ | 149 |
| Saponification value_____ | 247 |

This modified resin is useful in making water resistant varnishes.

*Example 4.*—100 parts of said N-Wood rosin and 10 parts of benzidine are heated in an open stainless steel kettle (at atmospheric pressure) for two hours at 240° C. The resultant modified resin has a dark ruby color and is a modified resin having the following properties:

| | |
|---|---|
| Melting point (mercury method)_____°C__ | 96 |
| Acid value _____ | 139 |
| Saponification value_____ | 247 |

This modified resin is likewise useful in making varnishes.

In addition to varying the amount of amine compound employed as the modifying agent, the temperature and time of heating may be also varied to obtain the modification desired. This is illustrated in the following examples:

*Example 5.*—100 parts of said N-Wood rosin and 10 parts of benzidine are heated in an open stainless steel kettle at 270° C. Samples are taken at various intervals to determine the extent of the modification. When the desired modification is obtained, the heating is discontinued and the modified resin cooled to room temperature.

The modification obtained with varying times of heating is shown in the following table:

| Time of heating, minutes | Melting point (mercury method) | Acid number |
|---|---|---|
| | °C. | |
| 15_____ | 76 | 147 |
| 45_____ | 84 | 136 |
| 90_____ | 98 | 118 |
| 120_____ | 104 | 104 |

*Example 6.*—100 parts of said N-Wood rosin and 5 parts of benzidine are heated in an open stainless steel kettle at 270° C. Samples are taken at various intervals to determine the extent of the modification. When the desired modification is obtained, the heating is discontinued and the modified resin cooled to room temperature.

The modification obtained with varying time of heating is shown in the following table:

| Time of heating, minutes | Melting point (mercury method) | Acid number |
|---|---|---|
| | °C. | |
| 15_____ | 87 | Not taken |
| 45_____ | 86 | 147 |
| 90_____ | 96.5 | 136 |
| 120_____ | 100 | 125 |

As shown in Examples 5 and 6, ante, the longer heating increases the melting point and decreases the acid value of the modified resin product. Likewise, by comparing the results obtained in Example 5, with those in Example 6, it will be seen that increasing the amount of amine compound employed as the modifying agent also decreased the acid number. Likewise, this also slightly increases the melting point after heating for an hour or more.

And in making my modified resin products I usually heat the mixture for one hour or more, say for 2 to 5 hours, depending upon the modification desired and with longer heating, greatly modified resin products may be obtained. This is illustrated by the following example:

*Example 7.*—100 parts of rosin and 10 parts of benzidine base are heated at 270 to 280° C. for 5 hours. Upon cooling a greatly modified resin product is obtained. This modified resin product may be incorporated and blended with varnish resins or fatty oils, including stand oils, or both in preparing commercial varnishes. The manufacture of one such varnish is illustrated in the following example.

*Example 8.*—To 200 parts of stand oil (heat-bodied linseed oil) having a viscosity of Q in the Gardner-Holdt scale, are added 100 parts of the modified resin product obtained in Example 7. This mixture is heated to 270-300° C. until a blended mixture, having the desired body is obtained.

The varnish base so obtained may be thinned with suitable solvents to obtain advantageous varnishes. The solvent may be petroleum thinner or coal tar thinner or hydrogenated naphtha thinner.

The varnishes so obtained are good drying and yield coatings which are resistant to water and weather.

Further illustrative examples of making my improved varnishes using my modified resin products are given in Examples 10, 11 and 12, post, together with a control varnish as shown in Example 9.

*Example 9.*—The control varnish is made as follows from

| | Parts |
|---|---|
| Heat-bodied linseed oil (heavy bodied)_____ | 100 |
| Lime-hardened rosin _____ | 50 | which are blended and cooked together into the varnish base. In doing so, the heat-bodied linseed oil and lime hardened rosin are cooked in a suitable varnish kettle in such a way that the temperature is brought to 300° C. in 30 minutes and then the mixture maintained at that temperature for one hour whereupon it is cooled.

When the varnish base so obtained has cooled to 200° C. it is then thinned with 150 parts of mineral spirits by weight. Then sufficient liquid naphthenate driers are added to yield a varnish containing, as the drier, 0.03 part cobalt, 0.02 part manganese and 0.30 part of lead, all present as naphthenates. This is the control varnish.

The improved varnishes are made by substituting part or all of the lime hardened rosin, in the above varnish base, with benzidine modified resin products made by the present invention. And in Examples 10, 11 and 12 post, I use a mixture consisting of equal parts by weight of (1) A modified rosin product obtained by heating rosin with 5 per cent of benzidine at 270° C. for 20 minutes (see Example 6) and (2) A modified rosin product obtained by heating rosin with 10 per cent benzidine at 270° C. for 120 minutes (see Example 5); these two modified rosin products being blended together in making the varnish base as shown post. And in Example 12 all of the lime hardened rosin is replaced with these benzidine modified resin products.

*Example 10.*—In this example, the varnish is made in the same way as in Example 9, except that 6 parts of said mixture of benzidine modified rosin products (1) and (2), ante, and only 44 parts of lime hardened rosin are used, instead of the original 50 parts of lime hardened rosin; the heating, thinning, etc., being the same as in Example 9.

*Example 11.*—In this example, the varnish is likewise made in the same way as in Example 9, except that 18 parts of said mixture of benzidine modified resin products (1) and (2), ante, and only 32 parts of lime hardened rosin are used, instead of the original 50 parts of lime hardened rosin; the heating, thinning etc. being the same as in Example 9.

That is, in making the improved varnishes in Examples 10 and 11, part of the lime hardened rosin is substituted with my modified resin products obtained with the aid of benzidine.

*Example 12.*—In this example, only benzidine modified resin products are used as the resin component of the varnish base; my benzidine modified resin products replacing all of the lime hardened rosin.

And in making this varnish, 100 parts of said heat-bodied linseed oil and 50 parts of said mixture of benzidine modified rosin products (1) and (2), ante, are cooked in a varnish kettle, the varnish base cooled and thinned with a solvent as in Example 9; a like amount of liquid naphthenate driers being added. The solution of varnish base so obtained is a heavy bodied varnish. And because of its heavy body, it is further thinned with 10 parts of denatured alcohol and 10 parts of acetone, to obtain a comparable varnish having approximately the same viscosity, etc., as that obtained in Example 9.

Coatings on steel plates were prepared from the four varnishes obtained in Examples 9, 10, 11 and 12, respectively, and these coatings tested and compared. In preparing the test coatings, the varnish was applied to the steel plate with the aid of a coating knife, so as to yield a coating having a film thickness of 0.003 inch and the coated plates left to dry for 48 hours. The dried coatings were subjected to various tests as follows:

(1) Cold water immersion tests were made by immersing the coated plate in cold water for 24 hours;

(2) Boiling water tests were made by immersing the coated plates in boiling water for 15 minutes;

(3) Alkali resistance tests were made by immersing coated plates in a 3 per cent solution of sodium hydroxide in water; the coated plate being immersed in the solution in the cold until the film dissolved and washed off the plate.

By such tests I have found that the coatings obtained from my improved varnishes have advantageous properties and are more resistant than the coatings obtained from the control varnish.

For instance, the cold water and boiling water immersion tests show that the coatings containing my benzidine modified rosin products have improved resistance to both cold and hot water. They further show that the resistance to cold and hot water of the coating improved as the amount of such modified resin product present in the film is increased. And the coating containing only benzidine modified rosin blended with the bodied oil shows the highest resistance both to cold and hot water, as well as to the aqueous alkali. It showed practically no effect from cold or boiling water. It was also very resistant to the aqueous alkali, showing practically no effect from the alkali after three hours immersion.

Other modified resin products made in accordance with the present invention gave similar improvements in various coating compositions. The above examples are merely illustrative embodiments of this invention. And in Examples 1 to 8, inclusive, in lieu of the specific amine compounds there employed as the modifying agent, other amine compounds may be used. Likewise, in those examples, in lieu of the rosin, other resins may be employed, either natural resins or synthetic resins.

Again, other fatty oils and varnish resins may be used in making varnishes and other coating compositions in lieu of the heat-bodied linseed oil and lime hardened rosin given in the illustrative examples ante.

Likewise, as stated ante, synthetic resins can be modified by the present invention, and a wide range of modified products obtained from various types of synthetic resins. This is further illustrated in the examples given post.

For instance, advantageous methods of modifying synthetic resins, particularly resinous esters, are illustrated in Examples 14 and 15. In those examples, the starting material is a commercial synthetic resin of the maleic type now used in making various types of varnishes. This commercial maleic resin contains a substantial amount of rosin chemically combined in the resinous complex and is made by reacting sufficient glycerine with 12 to 16 parts of maleic anhydride and 100 parts of rosin to form a maleic resin having an acid value of 36 and a melting point of 135° C. In the following example this resin is directly modified by incorporating a minor amount of an amine compound as the modifying agent.

*Example 13.*—In modifying the said commercial maleic resin, benzidine is employed as the modifying agent.

In doing so, 100 parts of this resin and 0.5 part of benzidine base are heated to 200° C. and maintained at that temperature for two hours. Then the resinous mixture is heated to 240° C. and after reaching this temperature, the resin is allowed to cool.

The modified maleic resin so obtained has a color slightly darker than the original maleic resin before treatment. It has a melting point of 132° C. and an acid value of 34.5. It is useful and advantageous in making varnishes and other coating compositions. It is also useful in making plastic compositions.

In the above example, other amine compounds may be used in lieu of benzidine as the modifying agent; advantageously amine compounds which are insoluble or only very slightly soluble in water. Again, the amount of modifying agent may be increased if a greater modification is desired, as shown ante.

Further, in addition to modifying such synthetic resins by directly incorporating the amine compound therein, as shown in the above example, they can also be modified by incorporating in such synthetic resins, minor amounts of The modified resin products made according to the processes described ante and containing an amine compound dispersed therein. For instance, my modified resin products obtained from natural resins, such as rosin, etc., are advantageous for this purpose. That is, in the practice of the present invention two-step methods may be employed. This is advantageous in making modified synthetic resins containing natural resins as a component of the resinous mixture. The use of my modified resin products, as the modifying agent, in such two-step processes is illustrated in the following examples:

*Example 14.*—In this example, the commercial maleic resin mentioned ante is modified with a minor amount of the benzidine modified resin product made according to Example 7 ante.

In doing so, 100 parts of the said maleic resin and 10 parts of said benzidine modified resin product (obtained in Example 7) are heated in the same way described in Example 13.

The modified maleic resin so obtained has a slightly darker color than the original maleic resin. It has a melting point of 130° C. (mercury method) and an acid value of 41.

In the above example, other amine modified resin products made in accordance with this invention, may be used in lieu of the said benzidine modified resin product, as the modifying agent. Again, the amount of such modifying agent may be varied as illustrated in the following example.

*Example 15.*—In this example, the said commercial maleic resin mentioned ante is modified with 5 per cent of the same modified resin product employed in Example 14; the heating and other conditions being the same as in that example.

In doing so, 100 parts of said maleic resin and 5 parts of said benzidine modified resin product (obtained in Example 7) are heated in the same way described in Example 13.

The modified maleic resin so obtained has a melting point of 130° C. and an acid value of 38.

The modified maleic resins obtained in Examples 14 and 15 are likewise useful in making varnishes and other coating and plastic compositions. And I have found that coatings containing any of these modified maleic resins, namely, the modified resin products obtained in Examples 13, 14 and 15, have improved alkali resistance and also improved resistance to cold and boiling water, as shown post.

In other words, the advantageous methods set forth in Example 13 and Examples 14 and 15, yield advantageous modified products. By the methods there illustrated, advantageous modified resin products can be obtained from other resinous esters of polyhydric alcohols, as stated ante. In other words, the said examples are merely illustrative of the present invention and other embodiments thereof may be employed within the broad scope of this invention.

In all cases, advantageous modifications of the synthetic resin are obtained. And as shown in Examples 13, 14 and 15, such modifications thereof can be obtained with relatively small amounts of an amine compound as the modifying agent. And as further shown in those examples, this may be done at relatively low temperatures. For instance, the slight decrease in melting point in Examples 13, 14 and 15, as compared with the melting point of the original maleic resin, is due in part to the low temperature employed and in part to the low percentage of modifying agent used. For purposes of comparison, the acid value and melting point of the original maleic resin and of the modified resin products obtained therefrom are given in the following table.

*Table 1*

| | Original maleic resin | New modified maleic resin | | |
|---|---|---|---|---|
| | | Ex. 13 | Ex. 14 | Ex. 15 |
| Melting point (mercury method) °C | 135 | 132 | 130 | 130 |
| Acid value | 36 | 34.5 | 41 | 38 |

In comparing the modified resin products of Examples 14 and 15 with the original maleic resin, it should be remembered that in incorporating the modifying agent there used, additional rosin is also introduced into the resinous complex; this added rosin (previously modified with the amine compound) having a lower melting point than that of the original maleic resin. Thus, the melting point in those cases is somewhat lower than that of the original maleic resin. Likewise, this also influences the acid value as is evident from the values given in the above table.

Thus, by selecting the particular modifying agent used and varying the proportion thereof and the other conditions, I can obtain modified resin products having the particular properties desired.

Further, phenolic resins can also be advantageously modified by the present invention, using the methods described ante. And as the starting material in such processes, I may employ any of the commercial phenolic resins containing natural resins or resinous esters thereof. In this way, I obtain advantageous modified resin products as illustrated in the examples given post.

For instance, in Examples 16, 17 and 18, I employ a commercial phenolic resin prepared by reacting formaldehyde with a substituted phenol until a soluble, fusible (A-stage) condensation product is obtained and then combining the A-stage phenolic resin with rosin and glycerine to form a complex phenolic resin. This complex phenolic resin had an acid value of 15 and a melting point of 137° C. It can be advantageously modified with amine compounds, as illustrated in the following examples.

*Example 16.*—In this example, 100 parts of said commercial phenolic resin and 0.5 part of benzidine base are heated to 200° C. and maintained at that temperature for two hours. Then the resinous mixture is heated to 240° C. and after reaching this temperature the resin is allowed to cool.

The amine modified phenolic resin so obtained has a slightly darker color than the original phenolic resin. It has a melting point of 145.5° C. (mercury method) and an acid value of 14.9. It is useful and advantageous in making varnishes and other coating compositions. It is also useful in making plastic compositions.

Again, in addition to modifying such synthetic resins by directly incorporating the amine compound therein, as shown in the above example, these phenolic resins can also be modified by incorporating minor amounts of the modified resin products made according to the processes described ante, and containing an amine compound dispersed therein. This is illustrated in the following example.

*Example 17.*—In this example, the commercial phenolic resin mentioned ante is modified with a minor amount of the benzidine-modified resin product made according to Example 7 ante.

In doing so, 100 parts of said commercial phenolic resin and 10 parts of said benzidine-modified resin product (obtained as in Example 7) are heated in the same manner described in Example 16.

The modified phenolic resin so obtained has a slightly darker color than the original phenolic resin. It has a melting point of 138° C. and an acid value of 27.1.

In the above example, the amount of said modifying agent may be varied as indicated ante. This is illustrated in the following example.

*Example 18.*—In this example, the procedure is the same as in Example 17 except that only 5 parts of said benzidine-modified resin product (obtained as in Example 7) is employed, as the modifying agent.

The modified phenolic resin product so obtained has a melting point of 136° C. and an acid value of 21.

The modified phenolic resin products obtained in Examples 17 and 18, like the modified resin product obtained in Example 16 are advantageous in making varnishes and other liquid coating compositions, as well as in making plastic compositions.

That is, my modified phenolic resin products have advantageous properties in such compositions. In general, they improve the properties of coatings containing substantial amounts of the same. For instance, they impart improved resistance to water, both hot and cold, and to aqueous alkaline solutions. Thus by my methods I obtain various other improvements, in addition to modifying the melting point, acid value and other physical properties of the synthetic resin employed as a starting material. For purposes of comparison, the acid value and melting point of the original phenolic resin employed in Examples 16 to 18 and of the modified resin products obtained therefrom in those examples are given in the following table:

Table 2

|  | Original phenolic resin | New modified phenolic resin | | |
| --- | --- | --- | --- | --- |
|  |  | Ex. 16 | Ex. 17 | Ex. 18 |
| Melting point (mercury method)°C | 137 | 145.5 | 138 | 136 |
| Acid value | 15 | 14.9 | 27.1 | 21 |

In preparing the modified phenolic resin products obtained in Examples 17 and 18 it should be remembered that additional rosin is also introduced into the resinous complex in the methods there described. As stated ante, those examples are illustrative of my two-step methods of modifying synthetic resins containing a natural resin as a component thereof. They are detail embodiments, illustrating the second step of such two-step methods.

In all cases, the incorporation of the amine compound, either directly or by a two-step method, produces advantageous modification of the synthetic resin. And in Examples 16 to 18, inclusive, other amine compounds may be employed. Likewise, other phenolic resins can be employed in lieu of the particular commercial phenolic resin there described.

That is, various commercial phenolic resins containing a natural resin or resinous esters thereof may be employed. Such phenolic resins are now widely used in making varnishes and are prepared by various methods. Some of the commercial phenolic resins of this type are made by heating phenol, formaldehyde and rosin together under reflux until a condensation product is obtained, the excess water distilled off and then esterifying the so condensed resin with glycerine to obtain a complex resin. The complex phenolic resins so prepared are excellent starting materials in my present processes and yield valuable modified phenolic resins according to the present invention.

Further, instead of starting with a commercial or pre-prepared synthetic resin, such as the resinous esters or complex phenolic resins mentioned ante, I may simultaneously make and modify the synthetic resin. That is, the amine compound may be introduced during the manufacture of the synthetic resin itself and the condensation and resinification effected in the presence of such modifying agents thereby directly producing the desired modified synthetic resin. Thus the present invention may be practiced in various ways, as stated ante, to obtain a wide range of advantageous modified products.

However, the modified synthetic resins prepared in Examples 13 to 18, inclusive, have properties which are particularly advantageous, as do the varnishes and coatings obtained from the same. And I have prepared valuable, improved varnishes and coatings from such modified synthetic resins as illustrated post. For instance, valuable varnishes can be prepared as shown in the following example.

*Example 19.*—In this example, the modified maleic resin obtained in Example 13 is used as the resin component of the varnish and is blended with linseed oil stand oil to obtain a valuable varnish base, the said oil and resin being cooked together until the desired body is obtained and then thinned with volatile solvents and driers added to obtain the final varnish.

And in making this varnish, 75 parts of said modified maleic resin (Example 13) and 150 parts of heavy-bodied linseed oil (stand oil) are heated to 300° C. and maintained at that temperature for 15 minutes, whereupon the blended mixture is cooled.

The varnish base so obtained is thinned with mineral spirits to obtain a varnish solution containing 50 per cent solids. To this solution are added sufficient naphthenate driers to give a varnish containing 0.03 per cent cobalt, 0.02 per cent manganese and 0.3 per cent lead, calculated as metal and based on the oil used. This solution containing the naphthenate driers is the varnish.

Further, using the same formula and procedure, I have prepared similar varnishes from the modified synthetic resins obtained in Examples 14 to 18, inclusive, by substituting each of those modified synthetic resins for the modified maleic resin employed in the above example.

And I have prepared coatings from the respective varnishes so obtained following the procedure described in Example 12 ante. Likewise I have tested the coatings so prepared using the tests also described in said Example 12.

I have found that each of said varnishes containing such modified synthetic resins likewise have advantageous properties. All of them yield films having slightly improved drying velocities, as compared with the similar varnish containing the unmodified synthetic resin. And the dried films or coatings so obtained have advantageous properties. For instance, the coatings containing my modified synthetic resins, obtained from the varnishes described ante, show marked improvement in alkali resistance by the said tests. They also gave improved resistance to both cold and boiling water.

Such embodiments of the present invention are typical of the improvements which can be obtained in the general practice thereof. And other improved varnishes may be prepared from my modified resin products, both those obtained from natural resins and from synthetic resins, as described ante. And in making my modified resin products various amine compounds may be employed as stated ante. And as there stated, sometimes the amine compound may be formed in situ. And as pointed out in connection with modifying rosin and other natural resins, part of the resin acid and the added amine compound may be reacted to form amine derivatives which themselves are modifying agents. In fact, I have found that I may use amine derivatives as the modifying agent and add them to the resin to be modified. For instance, the reaction products of benzidine and rosin are typical of amine derivatives which are useful as modifying agents in the present processes. Such amine derivatives can be prepared in various ways. For instance, they can be prepared as illustrated in the following example:

*Example 20.*—This example illustrates the preparation of an amine derivative, useful as a modifying agent in the present processes, from benzidine base and commercial rosin.

In making such amine derivatives, I first separately prepare aqueous solutions of a rosin soap (solution A) and of the dihydrochloride of benzidine (solution B) and then mix the two solutions and recover the rosin-benzidine derivative so formed.

In preparing said solution A, I mix together 200 grams of rosin (acid value 160) and 34 grams of potassium hydroxide dissolved in 2,200 grams of water, and heat the mixture until saponification is complete. The solution of rosin soap so obtained is filtered and 2,200 grams of clear filtrate is obtained.

In preparing said solution B, 55.8 grams of benzidine base, 22.4 grams of concentrated hydrochloric acid and 1,400 grams of water are mixed together, heated and filtered. There is obtained 1,144 grams of filtrate which is an aqueous solution of the dihydrochloride of benzidine; the benzidine base and hydrochloric acid being reacted together in the molar ratio of 1:2.

In preparing the said amine derivative from the separately prepared solutions, I slowly add to 1,130 grams of the rosin soap solution A at room temperature, 722 grams of solution B; solution B being added to solution A at a very slow rate under constant agitation. The resulting precipitate is washed in a filter press with cold water until it is free of chloride. The filter cake is dried at room temperature and ground to a powder. The dry, powdered rosin-benzidine derivative so obtained is an advantageous modifying agent in the present processes.

Again, the rosin-benzidine derivative can be prepared in a slightly different manner as shown in the following example.

*Example 21.*—Here, the rosin-benzidine derivative is also prepared from the same solutions A and B described in Example 20. But here the rosin soap solution A is very slowly added to the solution B at room temperature with constant agitation. The precipitate so obtained is filtered, washed and dried in the same way as described in Example 20.

The dry, powdered amine derivative so obtained is likewise useful as a modifying agent.

Other useful modifying agents can be prepared by the procedure of Examples 20 or 21 from aqueous solutions of other resin soaps and of other inorganic salts of various amine compounds.

The following examples illustrate the use of such amine derivatives as modifying agents in my processes:

*Example 22.*—This example illustrates the modification of a commercial N-Wood rosin having a melting point of 79° C. and an acid value of 167, with the aforesaid rosin-benzidine derivatives as the modifying agent.

In doing so, 100 parts of said N-Wood rosin and 10 parts of the rosin-benzidine derivative obtained in Example 20 are heated to 200° C. and the mixture maintained at that temperature for two hours. Then the hot resinous mixture is further heated to 240° C. and after reaching this temperature the molten rosin is allowed to cool.

The modified resin product so obtained has a melting point of 92° C. and an acid value of 159. It is useful in preparing various varnishes.

*Example 23.*—In this example, the aforesaid N-Wood rosin is modified in the same manner described in Example 22, except that 5 parts of said rosin-benzidine derivative (Ex. 20) are used in lieu of the 10 parts thereof employed in Example 22.

The modified resin product so obtained has a melting point of 93° C. and an acid value of 159. It, too, is useful in making various varnishes.

*Example 24.*—In this example, 100 parts of said N-Wood rosin and 10 parts of the rosin-benzidine derivative obtained in Example 21 are heated in the same manner described in Example 22.

The modified resin product as obtained has a melting point of 92° C. and an acid value of 160. Likewise, this modified resin product is useful in making improved varnishes.

*Example 25.*—In this example, the said N-Wood rosin is modified in the same manner as disclosed in Example 24 except that 5 parts of said benzidine product (Ex. 21) is employed instead of the 10 parts thereof used in Example 24.

The modified resin product so obtained has a melting point of 92° C. and an acid value of 158. Again, this modified resin is useful in making improved varnishes.

For purpose of comparison, the acid value and melting point of the original N-Wood rosin employed and of the modified resin products obtained therefrom in Examples 22 to 24, are tabulated in the Table 3 below:

*Table 3*

| | Original N-wood resin | New modified resin product | | | |
|---|---|---|---|---|---|
| | | Ex. 22 | Ex. 23 | Ex. 24 | Ex. 25 |
| Melting point (mercury method) ° C. | 79 | 92 | 93 | 92 | 92 |
| Acid value | 167 | 159 | 159 | 160 | 158 |

From the above table, it will be seen that these modified resin products are rather highly acid; the N-Wood rosin not being esterified during the modification. If modified resins having lower acid values are desired, they may be readily obtained by employing in Examples 22 to 25 suitable auxiliary agents, such as glycerine, etc., as described ante. However, for some purposes, modified resins having relatively high acid values are advantageous. And the modified resin products obtained in Examples 22 to 25 are typical of such modified resin products.

Also, the concentration of modifying agent in the final modified resin products obtained in Examples 22 to 25 is very low, calculated on the basis of the benzidine content thereof. And as stated ante, larger amounts of modifying agent may be employed if desired.

However, the modified resin products obtained in Examples 22 to 25 are all useful in making improved varnishes. And coatings containing such modified resin products have advantageous properties as shown post.

And I have prepared valuable improved varnishes and coatings from the modified resin products obtained in Examples 22 to 25, as illustrated post. For instance, valuable varnishes can be prepared from such modified resin products as shown in the following example.

*Example 26.*—In this example, the modified resin product obtained in Example 24 is used as the resin component of the varnish and is blended with linseed oil stand oil to obtain a valuable varnish base; the said oil and resin being cooked together until the desired body is obtained and then thinned with volatile solvents and driers added to obtain the final varnish.

In making this varnish, 75 parts of said modified resin product (Example 24) and 150 parts of heavy-bodied linseed oil (stand oil) are heated to 300° C. and maintained at that temperature for 15 minutes, whereupon the blended mixture is cooled.

The varnish base so obtained is thinned with mineral spirits to obtain a varnish solution containing 50 per cent solids. To this solution are added sufficient naphthenate driers to give a varnish containing 0.03 per cent cobalt, 0.02 per cent manganese and 0.3 per cent lead, calculated as metal and based on the oil used. This solution containing the naphthenate driers is the varnish.

Further, using the same formula and procedure, given ante in Example 26, I have prepared similar varnishes from the modified resin products obtained in Examples 22, 23 and 25, respectively, by substituting each of those modified resin products for the modified resin product (Example 21) employed in the above Example 26.

And I have prepared coatings from the respective varnishes so obtained, following the procedure described in Examples 12 and 19 ante. Likewise, I have tested the coatings so prepared using the tests also described in said Examples 12 and 19 ante.

By these and other tests, I have found that each of said varnishes containing said modified resin products, likewise have advantageous properties. In general, the coatings containing the said modified resin products have excellent alkali resistance. Also, their resistance to water, both boiling water and cold water, is very good. For instance, the coatings obtained from the varnish (Example 26) made with the modified resin product of Example 24, withstood an over-night immersion in 3 per cent caustic soda solution. Likewise the other coatings obtained from the varnishes made with the modified resin products of Examples 22, 23 and 25 showed good alkali resistance. They withstood 5 hours immersion in 3 per cent caustic soda solution. However, those coatings were gradually attacked when immersed over night in said caustic soda solution. Further, their resistance to boiling water and cold water are much improved over a similar varnish made with unmodified rosin, instead of said modified resin products. However, their resistance to boiling water and cold water, as shown by such tests, is not as good as that of the coating containing the modified resin product of Example 24, the latter coating having outstanding resistance to boiling water and cold water in such tests.

Again, the embodiments of my invention given in Examples 20 to 26 ante are merely illustrative of my broad invention and in the commercial practice of this invention, other embodiments may be employed as described ante.

That is, the above examples are illustrative of my generic processes, and in lieu of the particular isocolloid substances and particular amines there used, other isocolloid substances and specific amines previously described may be employed in like manner. Likewise the ratios and temperatures may be varied within the ranges specified ante. In this way a wide range of useful products may be obtained within the broad scope of this invention, each having its own advantageous properties and uses as shown generally in the broad disclosure heretofore set forth.

What I claim is:

1. The method of manufacturing modified rosin for use as a base of coating compositions, such as varnishes, which comprises dispersing from about .01% to 30% of an aromatic di-primary amine in rosin, and heating the mixture to a temperature of from 100° C. to 300° C. until a uniform product is obtained, having the capability of imparting increased water resistance to a varnish film made therewith, as compared with the water resistance of a varnish film made with the same rosin unmodified.

2. The method of manufacturing modified rosin for use as a base of coating compositions, such as varnishes, which comprises dispersing from about .01% to 10% of an aromatic di-primary amine in rosin, and heating the mixture to a temperature of from 100° C. to 300° C. until a uniform product is obtained, having the capability of imparting increased water resistance to a varnish film made therewith, as compared with the water resistance of a varnish film made with the same rosin unmodified.

3. A method in accordance with claim 2 wherein said amine is benzidine.

4. A method in accordance with claim 2 wherein from about 1% to 10% of said amine is used.

5. A method in accordance with claim 2 wherein the treatment temperature is from 200° C. to 300° C.

6. An improved base material for coating compositions, such as varnishes, which comprises modified rosin having uniformly dispersed therein from .01% to 10% of an aromatic di-primary amine, and having the capability of imparting increased water resistance to a varnish film made therewith, as compared with the water resistance of a varnish film made with the same rosin unmodified.

7. A varnish base in accordance with claim 6 wherein said amine is benzidine.

8. The method of manufacturing modified rosin for use as a base of coating compositions, such as varnishes, which comprises dispersing from about .01% to 10% of an aromatic di-primary amine in rosin, and heating the mixture to a temperature of from 100° C. to 300° C. for a period of time between about fifteen minutes and five hours.

9. A method in accordance with claim 8 in which the rosin is heated for at least one hour.

10. A method in accordance with claim 8 wherein said amine is benzidine.

11. A method in accordance with claim 8 wherein from about 1% to 10% of said amine is used.

12. A method in accordance with claim 8 wherein the treatment temperature is from 200° C. to 300° C.

LÁSZLÓ AUER.